United States Patent
Cordes et al.

[11] Patent Number: 5,989,087
[45] Date of Patent: Nov. 23, 1999

[54] LIDAR DETECTION USING SHADOW ENHANCEMENT

[75] Inventors: Brett W. Cordes, Panama City Beach; Jack M. Lloyd, Jr., Panama City, both of Fla.

[73] Assignee: The United States of America as represented by the Secretary of the Navy, Washington, D.C.

[21] Appl. No.: 09/045,966

[22] Filed: Mar. 18, 1998

Related U.S. Application Data

[63] Continuation-in-part of application No. 08/700,641, Jun. 28, 1996.
[51] Int. Cl.⁶ .............................. B63C 9/00; B63C 9/08; H01Q 17/00
[52] U.S. Cl. .................................. 441/83; 441/80; 342/4
[58] Field of Search .............................. 441/80, 83, 89, 441/20, 30; 116/202, 209, 211; 382/48; 342/1, 4, 450

[56] References Cited

U.S. PATENT DOCUMENTS

| | | | |
|---|---|---|---|
| 5,267,329 | 11/1993 | Ulich et al. | 382/48 |
| 5,421,287 | 6/1995 | Yonover | 116/209 |
| 5,710,989 | 1/1998 | Flood | 455/100 |

*Primary Examiner*—D. Glenn Dayoan
*Assistant Examiner*—Patrick Muldoon
*Attorney, Agent, or Firm*—Harvey A. Gibert; Donald G. Peck

[57] ABSTRACT

A method is presented for detecting a body at sea. A lidar system provided onboard an aircraft transmits radiation at a wavelength in the blue/green region of the energy spectrum towards the surface of the sea. The lidar system is tuned to receive return reflections occurring over a specified wavelength range. A shaped area located near the body is designed to inhibit any return reflections that would be detectable by the lidar system. The shaped area defines a shape that is abnormal for the area of the sea being searched and defines a size that is larger than the body. The presence of the body is indicated by a null return corresponding to the shape and size of the shaped area.

20 Claims, 1 Drawing Sheet

LIDAR DETECTION USING SHADOW ENHANCEMENT

This is a continuation-in-part of copending application Ser. No. 08/700,641, filed Jun. 28, 1996.

ORIGIN OF THE INVENTION

The invention described herein was made in the performance of official duties by employees of the Department of the Navy and may be manufactured, used, licensed by or for the Government for any governmental purpose without payment of any royalties thereon.

1. Field of the Invention

The invention relates generally to the detection of lost bodies (i.e., live personnel or inanimate objects) at sea using a lidar system, and more particularly to a method of detecting a body at sea by generation of a shadow signature, i.e., the signature is defined by no return reflection detectable by a monitoring lidar system.

2. Background of the Invention

The use of lidar and laser imaging systems has increased continually through the years. Of particular interest are applications relating to the search for live or inanimate bodies lost in open waters. One lidar-based airborne surveillance system is disclosed in U.S. Pat. No. 3,839,639. A fluorescent dye positioned at the sea surface is radiated by a laser beam originating from a laser mounted onboard an aircraft. As a result, the dye fluoresces and radiates energy in all directions. The radiated energy is detected by a detector typically located onboard the same aircraft as the detector. A drawback of this approach is that a covert operation may be compromised if unfriendly forces are also monitoring the sea surface for the radiated energy.

SUMMARY OF THE INVENTION

Accordingly, it is an object of the present invention to provide a method that positively reveals the location of a body at sea.

Another object of the present invention is to provide a covert method for detecting a body at sea.

Still another object of the present invention is to provide a lidar-based method of detecting a body at sea.

Other objects and advantages of the present invention will become more obvious hereinafter in the specification and drawings.

In accordance with the present invention, a method is presented for detecting a body at sea as an aircraft is flown over an area of the sea. A lidar system provided onboard the aircraft transmits radiation at a wavelength in the blue/green region of the energy spectrum. The radiation is directed towards the surface of the sea. The lidar system is tuned to receive return reflections occurring over a specified wavelength range where the return reflections are caused by the radiation. A shaped area located near the body is designed to inhibit return reflections detectable by the lidar system when the shaped area is subjected to the radiation from the lidar system. The shaped area defines a shape that is abnormal for the area of the sea being searched and defines a size that is larger than the body. The return reflections are monitored using the lidar system. The presence of the body is indicated by a null return corresponding to the shape and size of the shaped area.

DETAILED DESCRIPTION OF THE INVENTION

Figure 1:
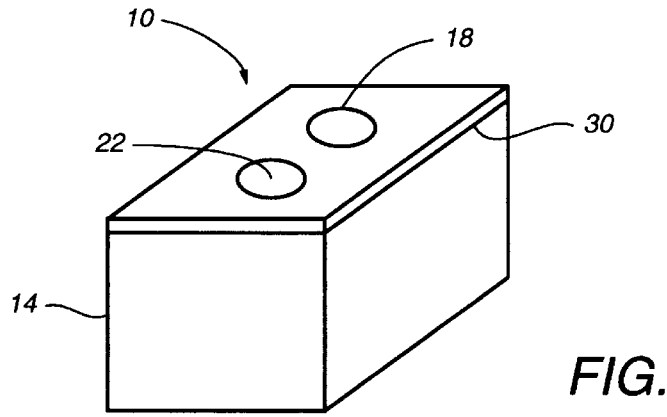
FIG. 1 is a diagrammatic view showing the operation of the present invention.

Referring now to the drawings, and more particularly to FIG. 1, the method of the present invention will be described for its use in detecting a live body 100 lost in any marine environment such as the sea 200. However, it is to be understood that the method of the present invention can also be used to detect any inanimate body either floating on or located under the surface of a marine environment. Accordingly, the term "body" used hereinafter shall be considered to define both live and inanimate bodies.

The present invention makes use of any aircraft such as a helicopter 10 having an onboard lidar system 11. Lidar system 11 includes a laser 11A capable of scanning beams of radiation (represented by arrows 12, 14 and 16) across the surface of the sea 200, and detecting reflections (represented by dashed line arrows 22, 24 and 26) at a sensor 11B. The wavelength of transmitted beams 12, 14 and 16 is preferably one selected from the blue/green region of the energy spectrum owing to its ability to be transmitted through the water. A good choice of wavelength is 532 nanometers (nm) because it is the frequency-doubled output of a Nd:YAG laser which operates at 1064 nm. The Nd:YAG laser is a commercially-available laser that has a high level of technical maturity.

The wavelength of reflections 22, 24 and 26 can be in the same blue/green region of the energy spectrum or some other wavelength region to which sensor 11B is sensitive. Reflections 22, 24 and 26 can be generated by surface returns (as is the case with reflections 22 and 24) and returns generated by objects (e.g., a fish 102) located beneath the surface of the sea 200 as well as the sea floor 202. In each case, however, sensor 11B is sensitive to such reflections.

Deployed near body 100 is a shaped area 30 designed to inhibit any reflective radiation therefrom (owing, for example, to transmitted beam 14 from laser 11A) to which sensor 11B is sensitive. As will be explained further below, shaped area 30 is created by a device (not shown FIG. 1) carried by or deployed near body 100. The device could be operated manually, automatically or remotely to generate shaped area 30. By way of example, shaped area 30 is located at the surface of the sea 200 and is depicted as a square that is considerably larger than body 100 and the surrounding environmental clutter. With respect to the size of shaped area 30, in general, shaped area 30 defines a shape that is abnormal for the area of the sea being searched and is of a size that is larger than body 100. For example, a five square meter area is typical of just a few larger fish having a low density per square nautical mile, e.g., the density of large sharks is only expected to be about one per nautical mile. An area greater than ten square meters is even less typical and would therefor stand out even more. Further, shaped area 30 can be deployed at the surface of the sea 200 as shown or beneath the surface.

With shaped area 30 so deployed, the method of detecting body 100 proceeds as follows. Aircraft 10 flies over an area of the sea 200 being searched. Lidar system 11 is operated so that laser 11A scans an area of the sea 200 in order to form an image of that area. Return reflections generated by the surface, objects under the surface of the sea 200 and sea floor 202 are monitored via an onboard display (not shown) coupled to lidar system 11. Such return reflections typically generate a positive image having an intensity commensurate with the strength of the reflection. However, when beam 14 from laser 11A strikes shaped area 30, a return reflection is inhibited or obscured so that no return reflection is detected by sensor 11B from shaped area 30. That is, either minimal or no return reflection is generated whatsoever (i.e., transmitted beam 14 is absorbed at shaped area 30 for purposes of covert operations) or a return reflection is generated at a wavelength outside the sensitivity of sensor 11B. Either way, lidar system 11 will output a null return corresponding to the size and shape of shaped area 30 as laser 11A scans its beam thereover.

As mentioned above, shaped area 30 is an abnormal shape for the area of the sea 200 being searched in order to present the personnel monitoring lidar system 11 with a null return that is either easily recognizable and/or unexpected. In terms of being easily recognizable, shaped area 30 can be any regular (e.g. square, circle, star, etc.) or irregular shape that is being specifically looked for using lidar system 11. For covert operations, shaped area 30 could be shaped to resemble forms of marine life that are either rarely found or never found in the area of the sea 200 being searched. In this way, lidar systems operated by any unfriendly forces would tend to ignore any such null returns.

As also mentioned above, shaped area 30 can be deployed at the surface of the sea 200 so that it can be observed visually as well as being observed with lidar system 11. For covert operations, however, it may be desirable to deploy shaped area 30 beneath the surface of the sea 200 so that it is both unseen and so that its credibility as a form of marine life is enhanced. The method described herein can detect a null return from beneath the surface of the sea 200 owing to the use of transmitted laser beams from the blue/green region of the energy spectrum which transmit well through water to generate return reflections from objects therein or from sea floor 202.

The size, shape and position of shaped area 30 is dependent on the type of device used to generate same.

Figure 2:
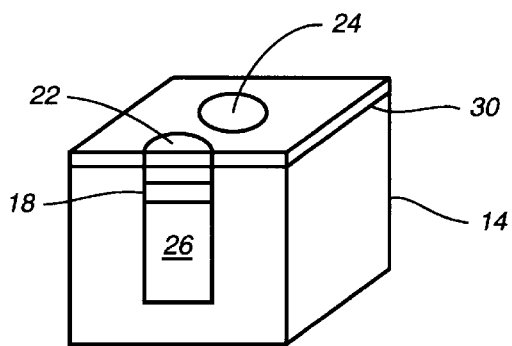
FIG. 2 is a perspective view of one embodiment of a device used to generate the shaped area used in the method of the present invention.

While many types of devices can be used to carry out the method of the present invention, several will be described herein by way of example. Referring now to FIG. 2, a device 32 for generating shaped area 30 is shown. Device 32 could be worn or carried by body 100, or could be tethered to body 100.

Device 32 typically has a container 320 defining one or more chambers 322 therein. The shape and size of container 320 as well as the number of chambers 322 contained therein is not a limitation on the present invention. For example, FIG. 2 illustrates two chambers 322 that are separated from one another by a divider 324. Each of chambers 322 is sealed by a cap 326. Depending on how device 32 is designed to operate, each cap 326 can be opened automatically when contacting water, e.g., a water soluble material that dissolves automatically in water, a cap sealed to container 320 by means of a water soluble glue, etc. Cap 326 could also be implemented by using a removable/puncturable seal that is manually removed/punctured by body 100. Still further, cap 326 could be part of a remotely operated system that opens chambers 322.

Figure 3:
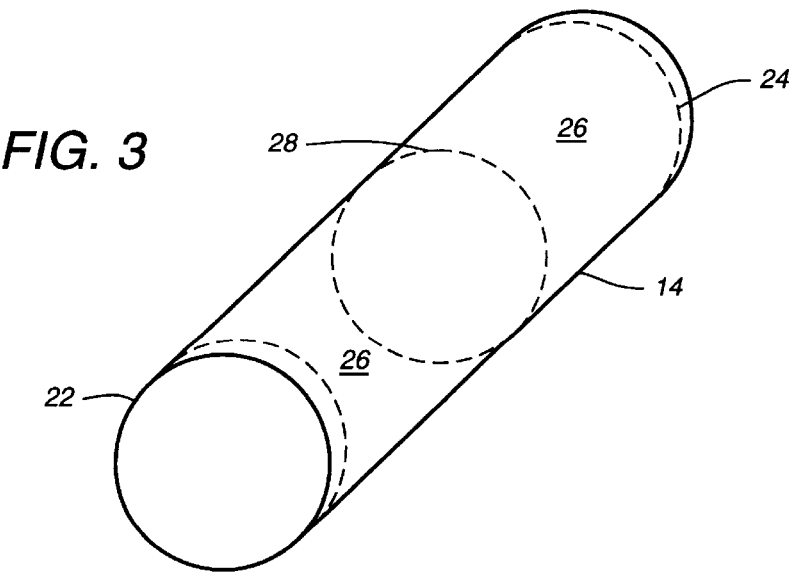
FIG. 3 is a schematic view of a remotely-operated chamber opening system that can be used to remotely activate the generation of the shaped area used in the present invention.

By way of example, one such remotely-operated opening system is depicted schematically in FIG. 3. A remotely-located transmitter 40 sends an "open" signal 42 which is detected by a receiver 328 mounted onboard device 32. As a result, receiver 328 triggers operation of an opener 330 which is coupled to cap 326 to unseal, remove or puncture same. For example, opener 330 could be a small charge that, when detonated, blows off cap 326.

It is also possible for each chamber 322 to be sealed by a different kind of cap 326. For example, one chamber might be sealed by a cap that is eliminated automatically when device 32 enters the sea 200 while another chamber could be sealed by a cap that must be manually or remotely eliminated. In this way, shaped area 30 could initially be generated automatically and later re-generated or duplicated if necessary.

Each chamber 322 contains a material that is incapable of generating a return reflection that could be sensed by sensor 11B when subjected to radiation from laser 11A. The material can be a flowable substance such as a dye, or a solid flexible substance such as a tarp that is furled within a chamber and is then unfurled to form shaped area 30 when expelled from the chamber.

The dye could be a liquid, powder or gel depending on the application and desired deployment at or beneath the surface of the water. For example, if the dye were to be deployed under the surface of the sea 200, it could exist in a form that is neutrally buoyant in water. A number of commercial dyes could be used in the present invention. For example, a suitable dye material that can be used with a 532 nm laser lidar imaging system is available commercially from the Eastman Kodak Company, Rochester, N.Y. under the name Styryl 17.

If a flexible tarp is used, it could be configured to unfurl into a specifically-designed shaped area 30 by means of inflation in accordance with methods/systems well known in the art. The inflation of the tarp material could also be used to cause the resulting shaped area 30 to float to the surface of the sea.

In still another embodiment of device 32, one chamber 322 could house a flexible furled floating boom similar to an oil slick boom, while another chamber could house a dye material. In use, the floating boom would be released first to unfurl and define a boundary of shaped area 30. The dye material could then be released and be substantially contained within the boundary defined by the boom in order to form the interior portion of shaped area 30.

The expulsion of any material from one of chambers 322 can be allowed to occur slowly as in the case of a dye material leaking from an opened one of chambers 322. Alternatively, the expulsion of the material can be carried out under force. For example, a dye material can be pressurized in its chamber so that it is expelled quickly. In a similar fashion, a tarp or boom-type element can be expelled by force by means of its inflation.

The advantages of the present invention are numerous. A lidar imaging system can be used to detect and locate a body at sea in a superior covert fashion. Selection of the shape used for reflection inhibition can be configured for a given mission without requiring any adaptation of the lidar imaging system.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by letters patent of the United States is:

1. A method of detecting a body at sea, comprising the steps of:

flying an aircraft over an area of the sea;

providing a lidar system onboard said aircraft;

transmitting radiation from said lidar system at a wavelength in the blue/green region of the energy spectrum, said radiation being directed towards the surface of the sea, said lidar system being tuned to receive return reflections occurring over a specified wavelength range wherein said return reflections are caused by said radiation;

providing a body at sea with a device for generating a lidar shadow near said body, said device containing a material incapable of generating one of said return reflections when subjected to said radiation;

releasing said material into the sea to form a shape that is abnormal for said area of the sea and a size that is larger than said body; and monitoring said return reflections using said lidar system as said aircraft flies over said area, wherein the presence of said material is indicated by a null return corresponding to said shape and said size of said material so released.

2. A method according to claim 1 wherein said material is flowable and wherein said step of releasing comprises the step of leaking said material into the sea.

3. A method according to claim 1 wherein said material is flowable and wherein said step of releasing comprises the step of expressing said material into the sea under force.

4. A method according to claim 1 wherein said step of releasing occurs automatically when said device enters the sea.

5. A method according to claim 1 wherein said step of releasing includes the step of activating said device to begin said step of releasing.

6. A method according to claim 5 wherein said step of activating occurs at a location remote from said device.

7. A method according to claim 5 wherein said step of activating occurs at said device.

8. A method according to claim 1 wherein said material is flexible and furled within said device until said step of releasing, and wherein said step of releasing includes the step of unfurling said material.

9. A method according to claim 8 further comprising the step of floating said material at the surface of the sea after said step of releasing.

10. A method according to claim 1 further comprising the step of maintaining said material below the surface of the sea after said step of releasing.

11. A method according to claim 1 further comprising the step of maintaining said material at the surface of the sea after said step of releasing.

12. A method according to claim 1 wherein said wavelength in the blue/green region of the energy spectrum is approximately 532 nanometers.

13. A method of detecting a body at sea, comprising the steps of:

flying an aircraft over an area of the sea;

providing a lidar system onboard said aircraft;

transmitting radiation from said lidar system at a wavelength in the blue/green region of the energy spectrum, said radiation being directed towards the surface of the sea, said lidar system being tuned to receive return reflections occurring over a specified wavelength range wherein said return reflections are caused by said radiation;

providing means for inhibiting said return reflections over a shaped area near said body when said shaped area is subjected to said radiation, said shaped area defining a shape that is abnormal for said area of the sea and a size that is larger than said body; and monitoring said return reflections using said lidar system as said aircraft flies over said area, wherein the presence of said body is indicated by a null return corresponding to said shape and said size of said shaped area.

14. A method according to claim 13 further comprising the step of defining said shaped area with a flowable material.

15. A method according to claim 13 further comprising the step of defining said shaped area with a flexible material.

16. A method according to claim 13 further comprising the step of defining said shaped area with a flowable material maintained within a defined boundary.

17. A method according to claim 13 further comprising the step of generating said shaped area automatically after said body enters the sea.

18. A method according to claim 13 wherein said wavelength in the blue/green region of the energy spectrum is approximately 532 nanometers.

19. A method according to claim 13 further comprising the step of positioning said shaped area at the surface of the sea.

20. A method according to claim 13 further comprising the step of positioning said shaped area below the surface of the sea.

* * * * *